United States Patent
Gruet et al.

(10) Patent No.: US 9,756,577 B2
(45) Date of Patent: Sep. 5, 2017

(54) METHOD FOR DEFINING PARAMETER VALUES FOR CONTROLLING THE TRANSMISSION POWER OF A PIECE OF USER EQUIPMENT

(71) Applicant: AIRBUS DS SAS, Elancourt (FR)

(72) Inventors: Christophe Gruet, Montigny le Bretonneux (FR); François Montaigne, Lille (FR); Jean-Christophe Schiel, Coignières (FR); Guy Philippe, Maurepas (FR)

(73) Assignee: AIRBUS DS SAS, Elancourt (FR)

( * ) Notice: Subject to any disclaimer, the term of this patent is extended or adjusted under 35 U.S.C. 154(b) by 0 days.

(21) Appl. No.: 14/915,427

(22) PCT Filed: Aug. 29, 2013

(86) PCT No.: PCT/FR2013/000223
§ 371 (c)(1),
(2) Date: Feb. 29, 2016

(87) PCT Pub. No.: WO2015/028723
PCT Pub. Date: Mar. 5, 2015

(65) Prior Publication Data
US 2016/0212714 A1    Jul. 21, 2016

(51) Int. Cl.
*H04B 7/00* (2006.01)
*H04W 52/24* (2009.01)
(Continued)

(52) U.S. Cl.
CPC ....... *H04W 52/241* (2013.01); *H04W 52/146* (2013.01); *H04W 52/242* (2013.01); *H04W 52/245* (2013.01)

(58) Field of Classification Search
CPC ........... H04W 52/146; H04W 52/241–52/242; H04W 52/245–52/248
(Continued)

(56) References Cited

U.S. PATENT DOCUMENTS

| 2008/0166976 | A1* | 7/2008 | Rao | ........................ H04W 52/10 455/69 |
| 2012/0322494 | A1 | 12/2012 | Zhou et al. | |

FOREIGN PATENT DOCUMENTS

EP    2 101 418 A1    9/2009

OTHER PUBLICATIONS

International Search Report as issued in International Patent Application No. PCT/FR2013/000223, dated Feb. 27, 2014.

* cited by examiner

*Primary Examiner* — Lee Nguyen
(74) *Attorney, Agent, or Firm* — Pillsbury Winthrop Shaw Pittman LLP

(57) ABSTRACT

A method for defining a parameter value for controlling the transmission power of a set of user equipment served by a cell defined by a base station of a cellular telecommunication network, includes, for the base station, receiving, from the set of user equipment located in the cell, a set of attenuation values including, respectively by piece of equipment, an attenuation value of a signal transmitted by the base station and received by the piece of user equipment and, if the piece of user equipment is also located in a non-serving cell, an attenuation value of a signal transmitted by the base station of the non-serving cell and received by the piece of user equipment; determining, from the set of received attenuation values, a value of a parameter for controlling the transmission power; and sending, to the set of user equipment served by the cell, the value of the control parameter.

8 Claims, 2 Drawing Sheets

Figure 1:
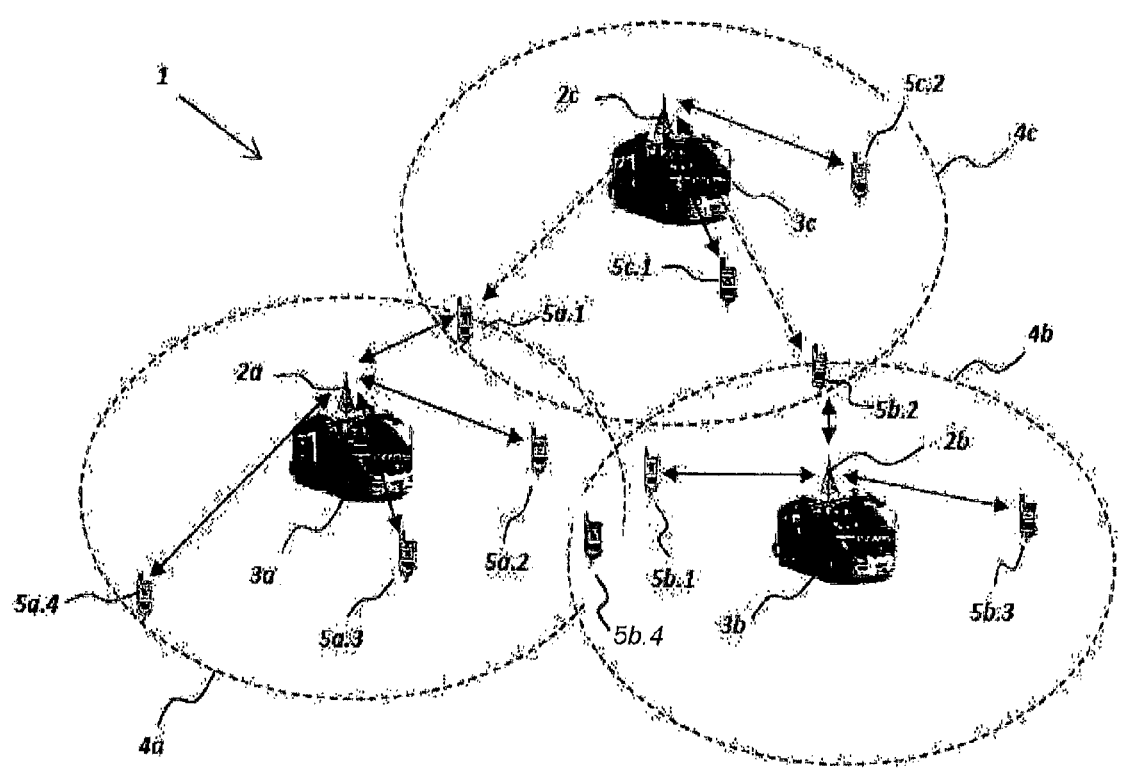

(51) Int. Cl.
*H04W 52/14* (2009.01)
*H04B 15/00* (2006.01)

(58) Field of Classification Search
USPC .......................................................... 455/522
See application file for complete search history.

METHOD FOR DEFINING PARAMETER VALUES FOR CONTROLLING THE TRANSMISSION POWER OF A PIECE OF USER EQUIPMENT

CROSS-REFERENCE TO RELATED APPLICATIONS

This is the U.S. National Stage of PCT/FR2013/000223, filed Aug. 29, 2013, the entire contents of the application is incorporated herein by reference in its entirety.

The invention relates to a method for defining parameter values for controlling the transmission power of pieces of user equipment in a cellular telecommunication network and a base station and a computer programme for implementing this method. The invention also relates to a cellular telecommunication network.

In a known manner a cellular telecommunication network comprises a plurality of base stations, each equipped to transmit signals over a radiating surface defining a cell, and pieces of user equipment configured to communicate with the base station of a cell in which they are located.

Thus during communication, a piece of user equipment located in a base station's cell can receive signals transmitted by this station and transmit signals to this station. A piece of user equipment may simultaneously find itself in a plurality of cells and thus receive signals from the various corresponding base stations. In this case the user equipment communicates across the network via one of the cells in which it is located, this cell then being called the service cell and the piece of user equipment is said to be served by this cell's base station or connected to this cell's base station. The cells defined by the neighbouring base stations from which the piece of user equipment receives signals but via which it does not communicate across the cellular network are then said to be non-serving.

Some of the signals transmitted by a base station to pieces of user equipment located in the corresponding cell contain messages which comprise transmission power control parameters for these pieces of user equipment. In order to transmit signals to the base station of a cell in which it is located, a piece of user equipment must beforehand adapt its transmission power using these values.

Cellular telecommunication networks are known, for example of the "Long Term Evolution" (LTE) type, in which the values of these control parameters are determined for each base station during planning of the network, that is, for a defined and fixed network configuration. The values thus pre-determined are then known to each base station during the commissioning of the network. Subsequently, when the network is in service, these pre-determined values are periodically transmitted by each base station in messages, encoded in signals transmitted by the station, to pieces of user equipment located within its cell.

A problem arises, however, when a base station in the network experiences a fault, or when a new base station has to be connected to the network, or when one or more base stations are mobile in relation to the others, as may be the case for example in a cellular telecommunication network of the "Professional Mobile Radio" (PMR) type.

In this case the values of the control parameters that have been predetermined for the network's original configuration and which are transmitted by each base station may therefore be incorrect. In other words, the transmission power of the pieces of user equipment may no longer be necessarily appropriate in certain cells. In particular this may result in unwanted interference between pieces of user equipment and/or neighbouring cells in the network, thus resulting in network malfunctions.

The aim of the present invention is to overcome these drawbacks and in particular to prevent interference caused by modification of the configuration or of the architecture of the cellular communication network, that is, when the number and/or the locations of the network base stations vary.

To this end the invention relates to a method for determining at least one parameter value for controlling the transmission power of a set of pieces of user equipment served by a cell defined by a telecommunication cellular network base station, characterized in that it comprises, for the base station, steps for:

receiving, from the set of pieces of user equipment located in the cell defined by the base station, a set of attenuation values comprising, respectively for each piece of user equipment, an attenuation value of a signal transmitted by the base station and received by the piece of user equipment and, if the piece of user equipment is also located in at least one non-serving cell, an attenuation value of a signal transmitted by the base station of the non-serving cell and received by the piece of user equipment;

determining, from the set of received attenuation values, a value of at least one parameter for controlling the transmission power; and sending, to the set of pieces of user equipment served by the cell defined by the base station, the value of the determined control parameter to adapt the transmission power of the set of pieces of user equipment.

The set of pieces of user equipment may comprise at least one piece of user equipment.

Thus the base station receives, from the piece or pieces of user equipment located in its cell, an attenuation value of a signal transmitted by itself and possibly one or more values of one or more signals transmitted by one or more base stations of non-serving cells. The term "non-serving cell" relates to a cell whose user equipment receives signals, for example a neighbouring cell, but by which it is not served or to which it is not connected, that is, through which it does not communicate through the cellular telecommunication network.

The base station transmits the value or values of the control parameters in signals sent to any piece of user equipment which might be located in its cell and which might be served by it, so that it can then use them. In other words, the base station broadcasts the values in signals which may then be received by the piece or pieces of user equipment located in its cell and which receive signals from the base station, that is, within the coverage of the base station.

Thus the present invention allows a base station of the network to dynamically determine the values of the control parameters during a modification of the network architecture or configuration. The values of the parameters are thus no longer predetermined and constant, but are now variable and adapted to the architecture or configuration of the network. Thus, for example, when a base station of a cellular telecommunication network is mobile in relation to another, each of the two stations may first receive, for example periodically, from the piece or pieces of user equipment located in its cell, signal attenuation values received by the piece or pieces of user equipment from one or other of the two base stations. Each base station may then determine and then communicate new values of control parameters to be used to adapt their transmission power levels to the pieces of user equipment located in its cell. Such a dynamic adaptation enables the architecture or the configuration of the network to be easily modified, whilst taking interferences likely to be caused by such modifications into consideration.

Preferably the method comprises a preliminary step of sending, to the set of pieces of user equipment served by the cell defined by the base station, a request to obtain the set of attenuation values comprising, respectively for to each piece of user equipment, an attenuation value of a signal transmitted by the base station and received by the piece of user equipment and, if the piece of user equipment is also located in at least one non-serving cell, an attenuation value of a signal transmitted by the base station of the non-serving cell and received by the piece of user equipment.

Advantageously, the request comprises information on the frequency of sending of the attenuation values of a signal by the pieces of user equipment, so that the base station can periodically receive said attenuation values and thus rapidly adapt the control parameters when a modification of cellular telecommunication network configuration or architecture occurs. The request may in addition comprise an attenuation value threshold beyond which the pieces of user equipment send said attenuation value or values to the base station.

The attention is preferably the "path loss" of a signal between the base station and a piece of user equipment of its cell. The term "path loss" relates to the attenuation or propagation reduction of a signal in the space between a base station and a piece of user equipment of its cell. The path loss is defined as being the ratio of the power received by a piece of user equipment to the power transmitted by a base station. Thus, knowing the transmission power of neighbouring base stations, a piece of user equipment can determine the path loss from the received power of a signal transmitted by a base station and received by said piece of user equipment.

According to one embodiment, the determination step comprises the steps of:

selection of a maximum attenuation value $PL_{MAX}$ from a set of attenuation values of at least one signal transmitted by the base station and received by each piece of user equipment served by the base station, calculation, for each piece of user equipment served by the base station, of the difference or differences between the attenuation value of a signal transmitted by each of the base stations for non-serving cells of said piece of user equipment and which are received by said piece of user equipment, and the attenuation value of a signal transmitted by the base station and received by said piece of user equipment, selection of the minimum $\Delta PL_{MIN}$ from amongst the difference values calculated for all pieces of user equipment served by the base station, calculation of a ratio $SINR_{MIN}$ in accordance with the formula $SINR_{MIN}=SINR_0+\Delta PL_{MIN}$, where $SINR_0$ is a predetermined constant, for example equal to about −3 dB, calculation of a value of a first transmission power control parameter for pieces of user equipment served by the base station in accordance with the formula:

$\alpha=1-(SINR_{MIN}-SINR_{MAX})/(PL_{MIN}-PL_{MAX})$ where $SINR_{MAX}$ and $PL_{MIN}$ are predetermined constants, calculation of a value of a second transmission power control parameter for pieces of user equipment served by the base station in accordance with the formula:

$P_0=SINR_{MIN}+(1-\alpha)PL_{MAX}-N_{thermal}$.

$N_{thermal}$ is a constant value, for example of the order of −117.5 dBm, which corresponds to thermal noise.

$SINR_{MAX}$ corresponds to the maximum signal-to-noise ratio expected for a piece of user equipment closest to the base station 2. The value of $SINR_{MAX}$ may be predetermined and constant, for example equal to 25 db.

$PL_{MIN}$ may have a predetermined and constant value which corresponds to the smallest expected path loss for the piece of user equipment closest to the base station 2, for example 50 dB.

$SINR_0$ is predetermined constant value, for example equal to −3 dB.

In a specific embodiment of the method according to the invention, $\alpha=1-(SINR_{MIN}-SINR_{MAX})/(PL_{MIN}-\beta \cdot PL_{MAX})$, where $\beta$ is a predetermined known correction coefficient for the base station greater than 1, for example of the order of 1.5.

In an alternative embodiment, $\alpha=1-(SINR_{MIN}-SINR_{MAX})/(PL_{MIN}-PL_{MAX}O)$ where $PL_{MAX}O=MAX$ $(PL_{MAX}, PL_{CONFIG_{MAX}})$, $PL_{CONFIG_{MAX}}$ being a value preconfigured in the base station which is representative of the $PL_{MAX}$ that it is sought to achieve at the base station.

According to an alternative embodiment of the method according to the invention, the determination step comprises the steps of:

selection of the k largest attenuation values from amongst a set of attenuation values of at least one signal transmitted by the base station and received by each piece of user equipment served by the base station, calculation of the mean attenuation value $PL_{AVG}$ of the k largest attenuation values selected, calculation, for each piece of user equipment served by the base station, of the difference or differences between the attenuation value of a signal transmitted by each of the base stations for non-serving cells of said pieces of user equipment and which are received by said piece of user equipment and the attenuation value of a signal transmitted by the base station and received by said piece of user equipment, selection of the k smallest calculated differences, calculation of the mean $\Delta PL_{AVG}$ of the k differences selected, calculation of a ratio $SINR_{MIN}$ in accordance with the formula $SINR_{MIN}=SINR_0+\Delta PL_{AVG}$, where $SINR_0$ is a predetermined constant, calculation of a value of a first transmission power control parameter for pieces of user equipment served by the base station in accordance with the formula:

$\alpha=1-(SINR_{MIN}-SINR_{MAX})/(PL_{MIN}-PL_{AVG})$, where $SINR_{MAX}$ and $PL_{MIN}$ are predetermined constants, calculation of a value of a second transmission power control parameter for pieces of user equipment served by the base station in accordance with the formula:

$P_0=SINR_{MIN}+(1-\alpha)PL_{AVG}-N_{thermal}$, where $N_{thermal}$ is a predetermined constant, for example of the order of −17.5 dBm, which corresponds to thermal noise.

Advantageously, $\alpha=1-(SINR_{MIN}-SINR_{MAX})/(PL_{MIN}-\beta \cdot PL_{MAX})$, where $\beta$ is a predetermined known correction coefficient for the base station, greater than 1, for example of the order of 1.5.

According to an embodiment of the method according to the invention, $PL_{MAX}$ may by a predetermined constant value.

The sending step of the method according to the invention may thus comprise the sending of the first and second control parameter values thus calculated In a specific embodiment of the method according to the invention, the determination and sending steps are carried out by a sub-set of pieces of user equipment from amongst the set of pieces of user equipment located in the base station's cell. Thus, for example, when the majority of pieces of user equipment are close to the base station and/or far from base stations of neighbouring cells, that is, when they are not potentially a source of interference for them, their transmission power may be configured differently, for example it may be greater than that of a set of pieces of user equipment located at the intersection of the cell and of a neighbouring cell and whose transmission power must be notably reduced in accordance with the invention in order to prevent them from being a source of interference.

The invention also relates to a base station for the implementation of the method as defined above, comprising:
- a reception module configured to receive, from a set of pieces of user equipment served by the cell defined by the base station, a set of attenuation values comprising respectively for each piece of user equipment an attenuation value of a signal transmitted by at least the base station and received by the piece of user equipment and, if the piece of user equipment is also located in at least one non-serving cell, an attenuation value of a signal transmitted by the base station of the non-serving cell and received by the piece of user equipment;
- a determination module, configured to define from the set of attenuation values received a value of at least one transmission power control parameter; and
- a transmission module configured to send to the set of pieces of user equipment served by the cell defined by the base station, the value of the determined control parameter to adapt the transmission power of the set of pieces of user equipment.

Preferably, the sending module is furthermore configured to send, to the pieces of user equipment served by the cell defined by the base station, a request to obtain the attenuation value of a signal transmitted by at least one base station and received by said pieces of user equipment.

Advantageously, the sending module is configured to send the request periodically.

Preferably, the determination module is in addition configured to:
- select a maximum attenuation value $PL_{MAX}$ from a set of attenuation values of at least one signal transmitted by the base station and received by each piece of user equipment served by the base station,
- calculate, for each piece of user equipment served by the base station, the difference or differences between the attenuation value of a signal transmitted by each of the base stations of non-serving cells of said pieces of user equipment and which are received by said piece of user equipment and the attenuation value of a signal transmitted by the base station and received by said piece of user equipment,
- select the minimum $\Delta PL_{MIN}$ from amongst the difference values calculated for all pieces of user equipment served by the base station,
- calculate a ratio $SINR_{MIN}$ in accordance with the formula $SINR_{MIN}=SINR_0+PL_{MIN}$, where $SINR_0$ is a predetermined constant,
- calculate a value of a first transmission power control parameter for pieces of user equipment served by the base station, in accordance with the formula:

$$\alpha=1-(SINR_{MIN}-SINR_{MAX})/(PL_{MIN}-PL_{MAX}),$$

where $SINR_{MAX}$ and $PL_{MIN}$ are predetermined constants,
- calculate a value of a second transmission power control parameter for pieces of user equipment served by the base station in accordance with the formula:

$$P_0=SINR_{MIN}+(1-\alpha)PL_{MAX}+N_{thermal},$$

where $N_{thermal}$ is a predetermined constant, for example of the order of −117.5 dBm, which corresponds to thermal noise.

Alternatively, the determination module is configured for:
- selection of the k largest attenuation values from amongst a set of attenuation values of at least one signal transmitted by the base station and received by each piece of user equipment served by the base station,
- calculation of the mean attenuation value $PL_{AVG}$ of the k largest attenuation values selected,
- calculation, for each piece of user equipment served by the base station, of a difference or differences between the attenuation value of a signal transmitted by each of the base stations of non-serving cells of said pieces of user equipment and which are received by said piece of user equipment, and the attenuation value of a signal transmitted by the base station and received by said piece of user equipment,
- selection of the k smallest calculated differences,
- calculation of the mean $\Delta PL_{AVG}$ of the k differences selected,
- calculation of a ratio $SINR_{MIN}$ in accordance with the formula $SINR_{MIN}=SINR_0\ PL_{MIN}$, where $SINR_0$ is a predetermined constant,
- calculation of a value of a first transmission power control parameter for pieces of user equipment served by the base station, in accordance with the formula:

$$\alpha=1-(SINR_{MIN}-SINR_{MAX})/(PL_{MIN}-PL_{AVG}),$$

where $SINR_{MAX}$ and $PL_{MIN}$ are predetermined constants,
- calculation of a value of a second transmission power control parameter for pieces of user equipment served by the base station in accordance with the formula:

$$P_0=SINR_{MIN}+(1-\alpha)PL_{AVG}+N_{thermal},$$

where $N_{thermal}$ is a predetermined constant, for example of the order of −117.5 dBm, which corresponds to thermal noise.

The invention also relates to a medium which can be read by a computer which stores instructions which are executable by the computer, and the execution of which enables the method as defined above to be implemented.

Advantageously, the piece or pieces of user equipment are connected to the base station.

The invention also relates to a cellular telecommunication network for the implementation of the method as defined above, comprising:
- at least one base station as defined above, each comprising:
  - a reception module configured to receive, from a set of pieces of user equipment served by the cell defined by the base station, a set of attenuation values comprising, respectively for piece of user equipment, an attenuation value of a signal transmitted by at least the base station and received by the piece of user equipment and, if the piece of user equipment is also located in at least one non-serving cell, an attenuation value of a signal transmitted by the base station of the non-serving cell and received by the piece of user equipment;

a determination module, configured to define, from the set of attenuation values received, a value of at least one transmission power control parameter; and a transmission module configured to send to the set of pieces of user equipment served by the cell defined by the base station, the value of the control parameter defined, to adapt the transmission power of the set of pieces of user equipment; and, a set of pieces of user equipment comprising at least one piece of user equipment configured to:

receive signals from the base station and possibly neighbouring base stations, determine at least one attenuation value from the signals received, send the determined attenuation value to the base station, receive a transmission power control parameter value, and adapt its transmission power using the received control parameter value.

Preferably each piece of user equipment of a cell spontaneously and/or periodically sends, to the base station of a cell in which it is located, attenuation values of signals received from the base station and possibly from neighbouring base stations.

The invention also relates to a medium which can be read by a computer which stores instructions which are executable by the computer, and the execution of which enables the method as defined above to be implemented.

Other characteristics and advantages of the invention will appear during the description which follows, in the light of the appended figures which are given as non-restrictive examples, wherein the same references are given to similar objects.

FIG. 1 is a schematic diagram of a cellular telecommunication network which comprises three base stations according to the invention.

Figure 2:
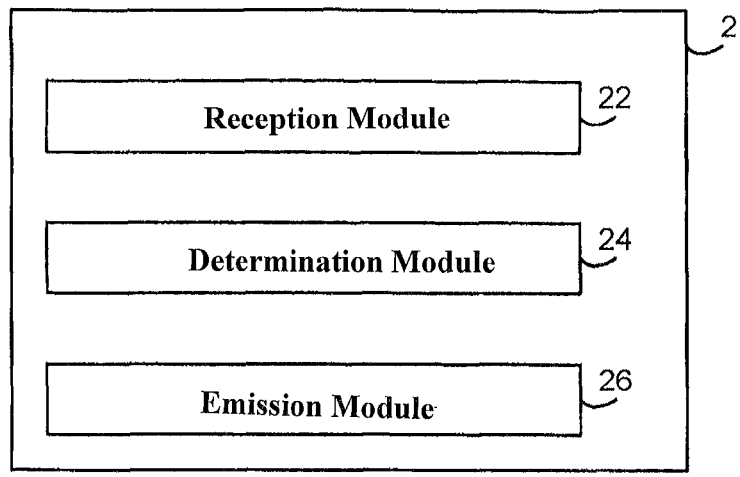

FIG. 2 schematically represents a base station according to the invention.

Figure 3:
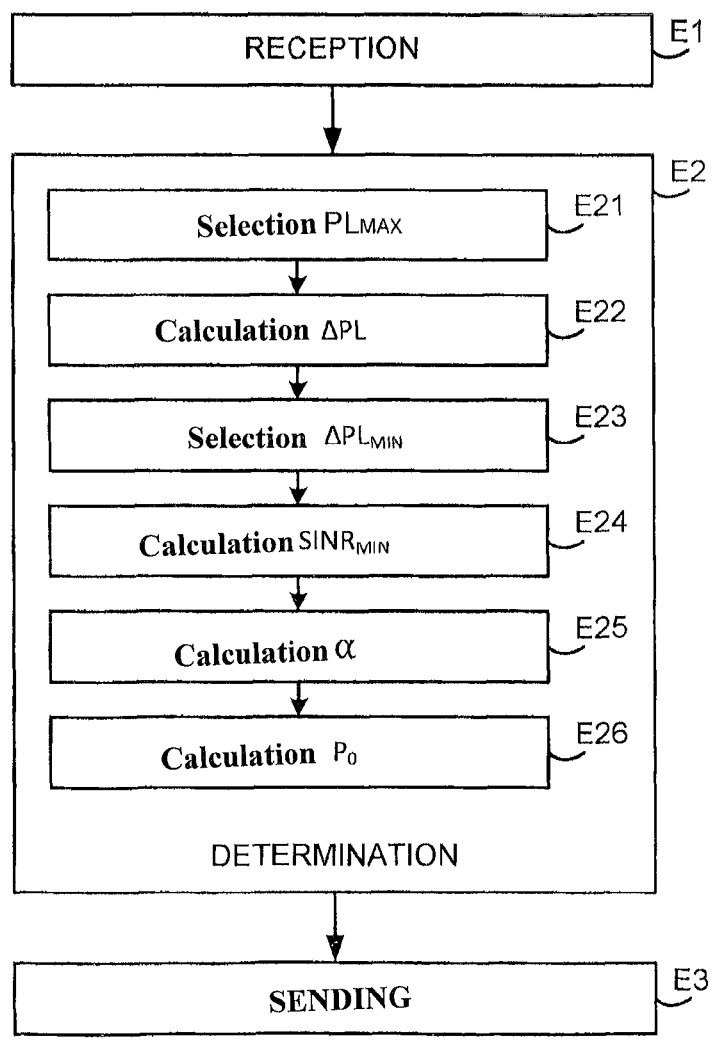

FIG. 3 shows the method implemented by the base station according to the invention.

The present invention is illustrated hereafter with reference to a cellular telecommunication network comprising mobile base stations, but without this being restrictive as to its scope. Indeed, the invention may also find application in a cellular telecommunication network comprising fixed base stations only or in cellular communication networks comprising both fixed and mobile base stations, for example when a new base station is incorporated into the network or when one of the network base station malfunctions.

Thus FIG. 1 shows a cellular telecommunication network 1 comprising three base stations 2a, 2b and 2c mounted respectively on mobile vehicles 3a, 3b, 3c. Such a cellular network may for example be a 3G type network or a Long-Term Evolution (LTE) type network defined in the context of the 3rd Generation Partnership Project (3GPP). In such a case, the base stations may be, for example, NodeB or eNodeB stations also defined in the context of the 3rd Generation Project (3GPP).

The base station 2a is equipped to transmit signals over a radiating surface defining a cell 4a and to receive signals from pieces of user equipment located in cell 4a. Similarly the base station 2b is equipped to transmit signals over a radiating surface defining a cell 4b and to receive signals from pieces of user equipment located in cell 4b. Similarly base station 2c is again equipped to transmit signals over a radiating surface defining a cell 4c and to receive signals from pieces of user equipment located in cell 4c.

As shown in FIG. 1, the cellular telecommunication cell 1 comprises:

pieces of user equipment 5a.1, 5a.2, 5a.3, 5a.4 located in the cell 4a and suitable for communicating with the base station 2a;

pieces of user equipment 5b.1, 5b.2, 5b.3, 5b.4 located in the cell 4b and suitable for communicating with the base station 2b, and;

pieces of user equipment 5c.1, 5c.2 located in cell 4c and which communicate with the base station 2c.

The pieces of user equipment 5a.1, 5a.2, 5a.3, 5a.4 are here served by or connected to the base station 2a. Similarly, the pieces of user equipment 5b.1, 5b.2, 5b.3, 5b.4 are served by the base station 2b and the pieces of user equipment 5c.1, 5c.2 are served by the base station 2c. The piece of user equipment 5a.1 is also located in cell 4c covered by the base station 2c and can consequently receive signals from this station 2c and determine the corresponding path loss for this even if this cell 4c is a non-serving cell for the piece of user equipment 5a.1. Similarly, the piece of user equipment 5b.2 is also located in cell 4c covered by the base station 2c and can consequently receive signals from this station 2c and determine the corresponding path loss for this even if this cell 4c is a non-serving cell for the piece of user equipment 5b.2. Similarly, the piece of user equipment 5b.4 is located in cell 4a covered by the base station 2a and can consequently receive signals from this station 2a and determine the corresponding path loss for this even if this cell 4a is a non-serving cell for the piece of user equipment 5b.4.

Such pieces of user equipment are illustrated in FIG. 1 by mobile pieces of user equipment. It is self-evident that the pieces of user equipment may be both mobile and/or fixed pieces of user equipment.

A piece of user equipment can be simultaneously located in a plurality of cells. Thus as illustrated by FIG. 1, the piece of user equipment 5a.1 is located both in cell 4a and in cell 4c and is served by the base station 2a of cell 4a, where the cell 4c is a non-serving cell of the piece of user equipment 5a.1. Similarly, the piece of user equipment 5b.4 is located both in cell 4b and in cell 4a and is served by cell 4b, where the cell 4a is a non-serving cell of the piece of user equipment 5b.4. Similarly, the piece of user equipment 5b.2 is located both in cell 4b and in cell 4c and is served by cell 4b, where cell 4c is a non-serving cell of the piece of user equipment 5b.2.

The base station according to the invention, illustrated by FIG. 2, comprises a reception module 22, a determination module 24 and a transmission module 26.

The reception nodule 22 is configured to receive, from at least one piece of user equipment located in the cell defined by the base station, at least one attenuation value for a signal transmitted by at least one base station. Thus the base station receives, from the piece or pieces of user equipment located in its cell, an attenuation value of a signal transmitted by itself and possibly one or more values of one or more signals transmitted by one or more base stations of non-serving cells.

The determination module 24 is configured to determine, from the attenuation value received, a value of at least one transmission power control parameter for signals to be transmitted by the piece or pieces of user equipment located in the cell.

In one embodiment of the base station 2 according to the invention, the determination module 24 is furthermore configured to:
- select the maximum path loss $PL_{MAX}$ from the set of path losses received between the base station and each piece of user equipment served by the base station,
- calculate, for each piece of user equipment served by the base station, the difference or differences between the path loss between each of the base stations of non-serving cells of said pieces of user equipment and said piece of user equipment, and the path loss between the base station and said piece of user equipment,
- select the minimum $\Delta PL_{MIN}$ from amongst the difference values calculated for all pieces of user equipment served by the base station,
- calculate $SINR_{MIN}$ in accordance with the formula $SINR_{MIN} = SINR_0 + PL_{MIN}$,
- calculate a value of a first transmission power control parameter for pieces of user equipment served by the base station, in accordance with the formula:

$$\alpha = 1 - (SINR_{MIN} - SINR_{MAX})/(PL_{MIN} - PL_{MAX}),$$

- calculate a value of a second transmission power control parameter for pieces of user equipment served by the base station, in accordance with the formula:

$$P_0 = SINR_{MIN} + (1-\alpha)PL_{MAX} + N_{thermal}$$

where $N_{thermal}$ is a constant value, for example of the order of −117.5 dBm, which corresponds to thermal noise.

The transmission module 26 is configured to send, for example periodically, to the piece or pieces of user equipment located in its cell, whether serving or non-serving for the said pieces of user equipment, a signal to determine an attenuation value in each piece of user equipment. With reference to the example in FIG. 1, the transmission module of base station 2a periodically sends a signal to the pieces of user equipment 5a.1, 5a.2, 5a.3, 5a.4 and 5b.4.

The transmission module 26 is furthermore configured to send to the piece or pieces of user equipment located in the cell defined by the base station, the control parameter value determined by the determination module 24. With reference to the example in FIG. 1, the transmission module of base station 2a sends the determined control parameter value to the pieces of user equipment 5a.1, 5a.2, 5a.3, 5a.4.

In a specific embodiment of the base station 2 according to the invention, the transmission module 26 is furthermore configured to send, for example periodically, to the piece or pieces of user equipment located in its cell and a served by it, a request to obtain at last one attenuation value for a signal transmitted by at least one base station and which is received by said pieces of user equipment.

Advantageously, the request comprises information on the frequency of sending of the attenuation values of a signal by the pieces of user equipment, so that the base station periodically receives said attenuation values and thus rapidly adapts the control parameter values when a change of cellular telecommunication network configuration or architecture occurs. The request may in addition comprise an attenuation value threshold beyond which the pieces of user equipment send said value or values to the base station.

The method according to the invention, illustrated by FIG. 3 and which will now be described with reference to FIGS. 1 to 3, can be used to determine the values of parameters for controlling the transmission power of a piece of user equipment in a cell defined by a base station of a cellular telecommunication network. The method is described hereafter for its implementation by the base station 2a, illustrated by FIG. 1, but without this restricting the scope of the present invention, since the method can be described, for example, for its implementation by the base station 2b or by the base station 2c.

The transmission module 26 of the base station 2a periodically transmits a signal to the pieces of user equipment, 5a.1, 5a.2, 5a.3, 5a.4 and 5b.4 comprised in cell 4a. On reception of the signal each piece of user equipment determines an attenuation value as a function of the signal received. The attenuation is preferably the "path loss" of a signal between the base station and a piece of user equipment of its cell. The term "path loss" relates to the attenuation or propagation reduction of a signal in the space between a base station and a piece of user equipment of its cell. The path loss is defined as being the ratio of the power received by a piece of user equipment to the power transmitted by a base station. Each piece of user equipment 5a.1, 5a.2, 5a.3, 5a.4 and 5b.4 determines a path loss value $PL2a(5a.2)$, $PL2a(5a.3)$, $PL2a(5a.4)$, $PL2a(5b.4)$ relative to the signal transmitted by the base station 2a. Similarly, the piece of user equipment 5a.1 which is also located in cell 4c determines a path loss value $PL2c(5a.1)$ as a function of a signal transmitted by base station 2c of the cell 4c.

In a step E1, the reception module 22 of the base station 2a receives a path loss value $PL2a(5a.2)$, $PL2a(5a.3)$, $PL2a(5a.4)$ from each piece user equipment 5a.2, 5a.3 and 5a.4 located in cell 4a defined by the base station 2a.

During this step E1, the reception module 22 of the base station 2a also receives, from the piece of user equipment 5a.1, a path loss value $PL2(5a.1)$ which corresponds to the attenuation of a signal transmitted beforehand by the base station 2a and received by the piece of user equipment 5a.1 and a path loss value $PL2c(5a.1)$ which corresponds to the attenuation of a signal transmitted beforehand by the base station 2c and received by the piece of user equipment 5a.1 located both in the cell 4a and in cell 4c.

At the same time, the path loss value $PL2a(5b.4)$ determined by the piece of user equipment 5.b.4 is received by the base station 2b which serves the piece of equipment 5b.4.

During a step E2, the determination module 24 of the base station 2a determines, from the received attenuation values $PL2a(5a.1)$, $PL2c(5a.1)$, $PL2a(5a.2)$, $PL2a(5a.3)$ et $PL2a(5a.4)$, at least one value of at least one transmission power control parameter for pieces of user equipment 5a.1, 5a.2, 5a.3 and 5a.4 located in cell 4a.

In a specific embodiment of the method according to the invention, a value of a first parameter $\alpha$ and a value of a second parameter $P_0$ are calculated. To this end, the determination step E2 comprises a step E21 selecting the maximum path loss $PL_{MAX}$ from amongst the set of received path losses $PL2a(5a.1)$, $PL2a(5a.2)$, $PL2a(5a.3)$ and $PL2a(5a.4)$ between the base station 2a and each piece of user equipment 5a.1, 5a.2, 5a.3 and 5a.4 served by the base station 2a. Then in a step E22, for each piece of user equipment 5a.1, 5a.2, 5a.3 and 5a.4 served by the base station 2a, the determination module 24 calculates the differences $\Delta PL$ between the path loss $PL2c(5a.1)$, $PL2c(5a.2)$, $PL2c(5a.3)$, $PL2c(5a.4)$ between the base station of the neighbouring cell 4c, which does not serve pieces of user equipment 5a.1, 5a.2, 5a.3 and 5a.4, and the piece of user equipment respectively 5a.1, 5a.2, 5a.3, 5a.4, and the path loss respectively, $PL2a(5a.1)$, $PL2a(5a.2)$, $PL2a(5a.3)$, $PL2a(5a.4)$ between the base station 2a and said piece of user equipment respectively 5a.1, 5a.2, 5a.3 and 5a.4. Similarly, the determination module 24 calculates the differences between the path loss $PL2b(5a.1)$, $PL2b(5a.2)$, $PL2b(5a.3)$, $PL2b(5a.4)$ between the base station of the neighbouring cell 4b, which does not serve pieces of user equipment 5a.1, 5a.2, 5a.3 and 5a.4 and the piece of user equipment respectively 5a.1, 5a.2, 5a.3, 5a.4, and the path loss respectively PL2a(5a.1), PL2a(5a.2), PL2a(5a.3), PL2a(5a.4) between the base station 2a and said piece of user equipment respectively 5a.1, 5a.2, 5a.3 and 5a.4. The determination module 24 selects, in a step E23, the minimum $\Delta PL_{MIN}$ of the calculated values of differences [PL2c(5a.1)-PL2a(5a.1)], [PL2c(5a.2)-PL2a(5a.2)], [PL2c(5a.3)-PL2a(5a.3)], [PL2c(5a.4)-PL2a(5a.4)], [PL2b(5a.1)-PL2a(5a.1)], [PL2b(5a.2)-PL2a(5a.2)], [PL2b(5a.3)-PL2a(5a.3)], [PL2b(5a.4)-PL2a(5a.4)] for pieces of user equipment respectively 5a.1, 5a.2, 5a.3 and 5a.4 served by the base station 2a.

Then in a step 24 the determination module 24 calculates the minimum ratio $SINR_{MIN}$ ("Signal-to-interference plus Noise Ratio") in accordance with the equation:

$$SINR_{MIN} = SINR_0 + \Delta PL_{MIN},$$

where $SINR_0$ is a known predetermined constant of the base station 2a. This ratio is the ratio between the power of a received signal and the sum of the power of the various interfering signals and noises received.

In a step E25 the determination module 24 then calculates a value of the first power control parameter of pieces of user equipment 5a.1, 5a.2, 5a.3 and 5a.4 in accordance with the formula:

$$\alpha = 1 - (SINR_{MIN} - SINR_{MAX})/(PL_{MIN} - PL_{MAX})$$

where, in this illustration embodiment, the value of $SINR_{MAX}$ is predetermined, constant and equal to 25 dB; the value of $PL_{MIN}$ is predetermined constant and equal to 50 dB.

In a step E26 the determination module 24 calculates a value of a second transmission power control parameter $P_0$ for pieces of equipment 5a.1, 5a.2, 5a.3, 5a.4 served by the base station 2a in accordance with the formula:

$$P_0 = SINR_{MIN} + (1-\alpha) PL_{MAX} - N_{thermal}$$

where $N_{thermal}$ is a constant value, for example of the order of −117.5 dBm, which corresponds to thermal noise.

In a step E3 the base station 2a sends the determined parameters values $\alpha$ and $P_0$ via the transmission module 26 to the pieces of user equipment 5a.1, 5a.2, 5a.3, 5a.4 located in cell 4a.

On reception of these parameters, the pieces of user equipment 5a.1, 5a.2, 5a.3, 5a.4 adapt their signal transmission power to the base station 2a using the values of parameters $\alpha$ and $P_0$ received, until they receive new values of $\alpha$ and $P_0$.

The values of the parameters $\alpha$ and $P_0$ are sent to the pieces of user equipment 5a.1, 5a.2, 5a.3, 5a.4 in messages encoded in signals transmitted by the base station 2a.

After receiving these values of parameters $\alpha$ and $P_0$ and whilst waiting to receive new values of these, any piece of user equipment that wishes to send signals to the base station of the cell in which it is located must beforehand adapt its transmission power using these values.

In the case of a Long-Term Evolution (LTE) type network, this adaptation of the power is achieved by the piece of user equipment according to the formula:

$$P_{PUSCH} = \text{Min}\{P_{MAX}, 10 \log(M_{PUSCH}) + P_0 + \alpha \cdot PL\} \quad [dBm]$$

where:

$P_{MAX}$ is the maximum power of the piece of user equipment;

$M_{PUSCH}$ is the number of resource blocks allocated to the piece of user equipment by the base station to which it is connected, where these blocks of resources allow the piece of user equipment to send and/or to receive data to communicate through the network by passing through the base station;

$P_L$ is the path loss between the piece of user equipment and the base station to which it is connected.

In a second embodiment of the method according to the invention, at step E25, $\alpha = 1 - (SINR_{MIN} - SINR_{MAX})/(PL_{MIN} - \beta \cdot PL_{MAX})$, where $\beta$ is a predetermined known correction coefficient for the base station greater than 1, for example of the order of 1.5.

In an alternative embodiment, $\alpha = 1 - (SINR_{MIN} - SINR_{MAX})/(PL_{MIN} - PL_{MAX}O)$ where $PL_{MAX}O = \text{MAX}(PL_{MAX}, PL_{CONFIG_{MAX}})$, where $PL_{CONFIG_{MAX}}$ is a value preconfigured in the base station which is representative of the $PL_{MAX}$ that it is sought to achieve at the base station.

According to a third alternative embodiment of the method according to the invention, the determination step E2 comprises:

the step E21 comprising:
  selection of k largest path losses from amongst the set of path losses received between the base station and each piece of user equipment served by the base station, and
  calculation of the mean path loss $PL_{AVG}$ of the k largest path losses selected, the step E22 comprising:
  calculation, for each piece of user equipment served by the base station, of the difference or differences between the path loss between each of the base stations of non-serving cells of said pieces of user equipment and said piece of user equipment and the path loss between the base station and said piece of user equipment,
  selection of the k smallest calculated path loss differences,
  calculation of the mean $\Delta PL_{AVG}$ of the k differences selected, where step E24 comprises calculation of $SINR_{MIN}$ according to the formula $SINR_{MIN} = SINR_0 + \Delta PL_{AVG}$, where step E25 comprises a calculation of a value of a first transmission power control parameter for pieces of user equipment served by the base station, in accordance with the formula:

$$\alpha = 1 - (SINR_{MIN} - SINR_{MAX})/(PL_{MIN} - PL_{AVG}),$$

where $SINR_{MAX}$, $SINR_{MIN}$ and $PL_{MIN}$ are predetermined constants, where step E26 comprises a calculation of a value of a second transmission power control parameter for pieces of user equipment served by the base station, in accordance with the formula:

$$P_0 = SINR_{MIN} + (1-\alpha) PL_{AVG} + N_{thermal}$$

where $N_{thermal}$ is a constant value, for example of the order of −117.5 dBm, which corresponds to thermal noise.

Advantageously, $\alpha = 1 - (SINR_{MIN} - SINR_{MAX})/(PL_{MIN} - \beta \cdot PL_{AVG})$, where $\beta$ is a predetermined known correction coefficient for the base station, greater than 1, for example of the order of 1.5.

According to an embodiment of the method according to the invention, $PL_{MAX}$ may be a predetermined constant value.

In a specific embodiment of the method according to the invention, the base station can decide that a number K1, greater than equal to one, of pieces of user equipment adjacent to one or more neighbouring cells is low in comparison with the number K2 of pieces of user equipment non-adjacent to neighbouring cells (the concept of adjacence may be defined, for example, depending on the path loss that these pieces of user equipment have with neighbouring cells, that is, for example, if their path loss $PL_{MIN}$ with each neighbouring cell is greater than a predetermined threshold then the piece of user equipment is not adjacent to said cell otherwise it is adjacent). The predetermined threshold is defined such that a proportion of pieces of user equipment K1 must be significant in relation to the proportion of pieces of user equipment K2 in order to implement the method according to the invention. If the ratio K1/K2 is less than the predetermined threshold then it may be decided to apply the method according to the invention to the K1 pieces of user equipment and to use a dedicate power control method known as "closed loop power control" for the remaining K2 pieces of user equipment (individualised processing).

When a base station is isolated, that is, when there is no intersection of its cell with a neighbouring cell, the station may detect this state (for example when the attenuation values returned by the pieces of user equipment are very low, less than a certain threshold) and then require, for example, that $\alpha=0$ and $P_0=P_{MAX}$, so that the pieces of user equipment, which are not then a potential source of interference for the neighbouring cells, transmit at their maximum power to the base station.

Thus the method according to the invention allows the transmission power control parameters values to be determined for pieces of user equipment in a cellular telecommunication network whose architecture is variable, that is, in which the number and/or positioning of base stations is/are variable.

The invention claimed is:

1. A method for defining at least one parameter value for controlling a transmission power of a set of pieces of user equipment-served by a cell defined by a telecommunication cellular network base station, the method comprising, for the base station:
   receiving, from the set of pieces of user equipment located in the cell defined by the base station, a set of attenuation values comprising, respectively for each piece of user equipment, an attenuation value of a signal transmitted by the base station and received by the piece of user equipment and, if the piece of user equipment is also located in at least one non-serving cell, an attenuation value of a signal transmitted by a base station of the non-serving cell and received by the piece of user equipment;
   determining, using the set of attenuation values received, a value of at least one transmission power control parameter ($\alpha$, $P_0$); and
   sending to the set of pieces of user equipment served by the cell defined by the base station, the determined value of the control parameter ($\alpha$, $P_0$), to adapt the transmission power of the set of pieces of user equipment,
   wherein the determining comprises:
   selecting a maximum attenuation value $PL_{MAX}$ from amongst a set of attenuation values of at least one signal transmitted the base station, and received by each piece of user equipment served by the base station;
   calculating, for each piece of user equipment served by the base station, a difference or differences between the attenuation value of a signal transmitted by each of the base stations for non-serving cells of said piece of user equipment and which are received by said piece of user equipment and the attenuation value of a signal transmitted by the base station and received by said piece of user equipment;
   selecting a minimum $\Delta PL_{MIN}$ from amongst the values of the differences calculated for all pieces of user equipment served by the base station;
   calculating a ratio $SINR_{MIN}$ in accordance with the formula $SINR_{MIN}=SINR_0+\Delta PL_{MIN}$, where $SINR_0$ is a predetermined constant;
   calculating a value of a first transmission power control parameter $\alpha$ for pieces of user equipment served by the base station in accordance with the formula:

$\alpha=1-(SINR_{MIN}-SINR_{MAX})/(PL_{MIN}-\beta\cdot PL_{MAX})$, where $\beta$ is a predetermined known correction coefficient for the base station and where $SINR_{MAX}$ and $PL_{MIN}$ are predetermined constants, and
   calculating a value of a second transmission power control parameter $P_0$ for pieces of user equipment served by the base station in accordance with the formula:

$P_0=SINR_{MIN}+(1-\alpha)PL_{MAX}+N_{thermal}$, where $N_{thermal}$ is a predetermined constant.

2. The method according to claim 1, further comprising a preliminary step of sending, to the set of items of user equipment served by the cell defined by the base station, a request to obtain a set of attenuation values comprising, respectively for each piece of user equipment, an attenuation value of a signal transmitted by the base station and received by the piece of user equipment and, if the piece of user equipment is also located in at least one non-serving cell, an attenuation value of a signal transmitted by the base station of the non-serving cell and received by the piece of user equipment.

3. A base station, for implementing the method according to claim 1, comprising:
   a reception module configured to receive, from the set of pieces of user equipment served by the cell defined by the base station, a set of attenuation values comprising, respectively for each piece of user equipment, an attenuation value of a signal transmitted by the base station and received by the piece of user equipment and, if the piece of user equipment is also located in at least one non-serving cell, an attenuation value of a signal transmitted by the base station of the non-serving cell and received by the piece of user equipment;
   a determination module, configured to determine, from the set of attenuation values received, a value of at least one transmission power control parameter; and
   a transmission module configured to send, to the set of pieces of user equipment served by the cell defined by the base station, the value of the determined control parameter, to adapt the transmission power of the set of pieces of user equipment.

4. A non-transitory readable medium that is readable by computer which stores instructions which are executable by the computer, and the execution of which enables the method according to claim 1 to be implemented.

5. A cellular telecommunication network, for implementing the method according to claim 1, comprising:
   at least one base station, each comprising:
   a reception module configured to receive, from a set of pieces of user equipment served by the cell defined by the base station, a set of attenuation values comprising, respectively for each piece of user equipment, an attenuation value of a signal transmitted by at least the base station and received by the piece of user equipment and, if the piece of user equipment is also located in at least one non-serving cell, an attenuation value of a signal transmitted by the base station of the non-serving cell and received by the piece of user equipment;

a determination module, configured to determine, from the set of attenuation values received, a value of at least one transmission power control parameter; and a transmission module configured to send, to the set of pieces of user equipment served by the cell defined by the base station, the value of the determined control parameter, to adapt the transmission power of the set of pieces of user equipment; and, a set of pieces of user equipment served by the cell of the base station where the set of pieces of user equipment comprises at least one piece of user equipment configured to:

receive signals from the base station and optionally neighboring base stations, determine at least one attenuation value from the signals received, send the determined attenuation value to the base station, receive a transmission power control parameter value, and adapt its transmission power using the received control parameter value.

6. The method according to claim 1, wherein the coefficient $\beta$ is equal to 1.

7. A method for defining at least one parameter value for controlling a transmission power of a set of pieces of user equipment-served by a cell defined by a telecommunication cellular network base station, the method comprising, for the base station:

receiving, from the set of pieces of user equipment located in the cell defined by the base station, a set of attenuation values comprising, respectively for each piece of user equipment, an attenuation value of a signal transmitted by the base station and received by the piece of user equipment and, if the piece of user equipment is also located in at least one non-serving cell, an attenuation value of a signal transmitted by a base station of the non-serving cell and received by the piece of user equipment;

determining, using the set of attenuation values received, a value of at least one transmission power control parameter ($\alpha$, $P_0$); and sending to the set of pieces of user equipment served by the cell defined by the base station, the determined value of the control parameter ($\alpha$, $P_0$), to adapt the transmission power of the set of pieces of user equipment, wherein the determining comprises:

selecting a maximum attenuation value $PL_{MAX}$ from amongst a set of attenuation values of at least one signal transmitted by the base station, and received by each piece of user equipment served by the base station;

calculating, for each piece of user equipment served by the base station, a difference or differences between the attenuation value of a signal transmitted by each of the base stations for non-serving cells of said piece of user equipment and which are received by said piece of user equipment and the attenuation value of a signal transmitted by the base station and received by said piece of user equipment;

selecting a minimum $\Delta PL_{MIN}$ from amongst the values of the differences calculated for all pieces of user equipment served by the base station;

calculating a ratio $SINR_{MIN}$ in accordance with the formula $SINR_{MIN}=SINR_0+PL_{MIN}$, where $SINR_0$ is a predetermined constant;

calculating a value of a first transmission power control parameter $\alpha$ for pieces of user equipment served by the base station, in accordance with the formula:

$$\alpha=1-(SINR_{MIN}-SINR_{MAX})/(PL_{MIN}-PL_{MAX})$$

where $SINR_{MAX}$ and $PL_{MIN}$ are predetermined constants, and calculating a value of a second transmission power control parameter for pieces of user equipment served by the base station, in accordance with the formula:

$$P_0=SINR_{MIN}+(1-\alpha)PL_{MAX}+N_{thermal}$$

where $N_{thermal}$ is a predetermined constant.

8. A method for defining at least one parameter value for controlling a transmission power of a set of pieces of user equipment-served by a cell defined by a telecommunication cellular network base station, the method comprising, for the base station:

receiving, from the set of pieces of user equipment located in the cell defined by the base station, a set of attenuation values comprising, respectively for each piece of user equipment, an attenuation value of a signal transmitted by the base station and received by the piece of user equipment and, if the piece of user equipment is also located in at least one non-serving cell, an attenuation value of a signal transmitted by a base station of the non-serving cell and received by the piece of user equipment;

determining, using the set of attenuation values received, a value of at least one transmission power control parameter ($\alpha$, $P_0$); and sending to the set of pieces of user equipment served by the cell defined by the base station, the determined value of the control parameter ($\alpha$, $P_0$), to adapt the transmission power of the set of pieces of user equipment, wherein the determining comprises:

selecting the k largest attenuation values from amongst a set of attenuation values of at least one signal transmitted by the base station, and received by each piece of user equipment served by the base station;

calculating a mean attenuation value $PL_{AVG}$ of the k largest attenuation values selected;

calculating, for each piece of user equipment served by the base station, a difference or differences between the attenuation value of a signal transmitted by each of the base stations of non-serving cells of said piece of user equipment and which are received by said piece of user equipment and the attenuation value of a signal transmitted by the base station and received by said piece of user equipment;

selecting the k smallest calculated differences;

calculating a mean $\Delta PL_{AVG}$ of the k differences selected;

calculating a ratio $SINR_{MIN}$ in accordance with the formula $SINR_{MIN}=SINR_0+\Delta PL_{AVG}$, where $SINR_0$ is a predetermined constant, calculating a value of a first transmission power control parameter $\alpha$ for pieces of user equipment served by the base station in accordance with the formula:

$$\alpha=1-(SINR_{MIN}-SINR_{MAX})/(PL_{MIN}-PL_{MAX}),$$

where $SINR_{MAX}$ and $PL_{MIN}$ are predetermined constants, and calculating a value of a second transmission power control parameter $P_0$ for pieces of user equipment served by the base station in accordance with the formula:

$P_0 = SINR_{MIN} + (1-\alpha)PL_{AVG} + N_{thermal}$, where $N_{thermal}$ is a predetermined constant.

* * * * *